Feb. 12, 1952     C. H. O. LUBECK     2,585,564
CLOSURE FOR TANKS CONTAINING BATTERY CELLS
Filed July 12, 1946
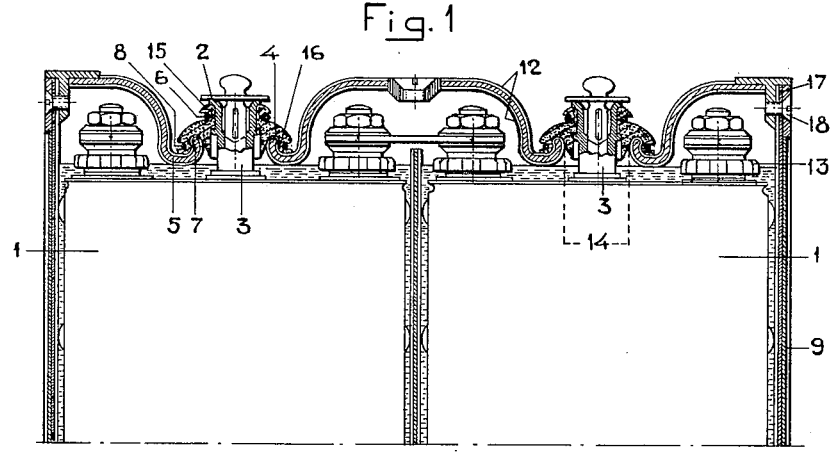
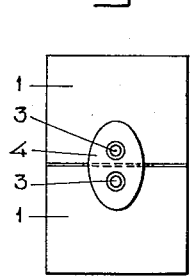 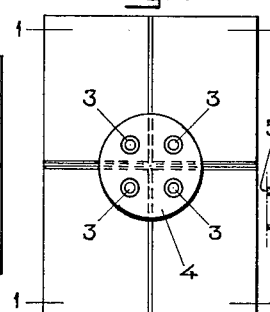 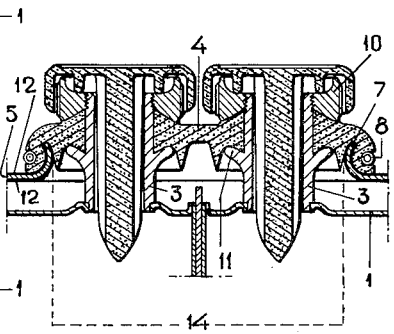
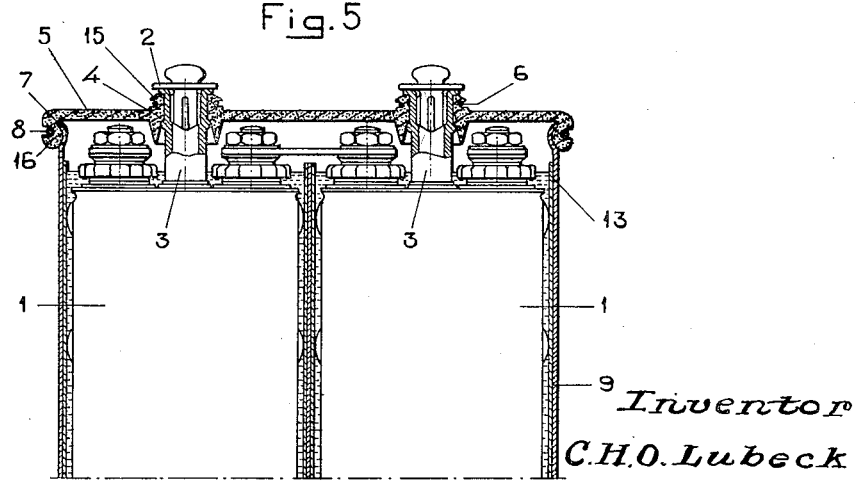
Inventor
C.H.O. Lubeck Patented Feb. 12, 1952

2,585,564

UNITED STATES PATENT OFFICE 2,585,564

CLOSURE FOR TANKS CONTAINING BATTERY CELLS

Carl Hilding Ossian Lübeck, Stockholm, Sweden

Application July 12, 1946, Serial No. 682,991
In Sweden August 25, 1943

Section 1, Public Law 690, August 8, 1946
Patent expires August 25, 1963

4 Claims. (Cl. 136—170)

The present invention relates to improvements in electric storage batteries and is particularly intended to be used in connection with alkaline storage batteries having cell cans or containers consisting entirely or partly of electrically conducting material, the cells being enclosed in a watertight battery tank, with the cells electrically insulated from one another and from the tank by solid insertions of insulating material and the tank filled with oil or other electrically insulating liquid or semi-liquid substance, in which the cells are submerged to about the upper edges of the cell cans or even over the pole bolts and the electric connections between the cells, the battery tank being closed by a cover, through which the tubular fillers or vents of the cells extend.

In such an arrangement of a battery it is important to prevent electrolyte that might overflow while charging the battery or spilled when filling the cells, or water when flushing, to penetrate into the interior of the oil-filled battery tank. Although it may seem rather a simple matter to insure a satisfactory tightening, experience has proved, that it is really connected with considerable difficulties, particularly when the battery consists of a large number of cells, to get all the vent tubes extending from the cells to fit simultaneously into the corresponding holes of the cover without large margins being allowed in the holes or greater precision and care having to be put down on the job, than desirable from a manufacturing point of view.

The problem is solved in an effective and simple manner by means of the present invention, which is here described with reference to the accompanying drawing. In the drawing Fig. 1 is a vertical section of the upper part of a battery and shows two cells or the front of two rows of cells, the vent tubes of the cells extending through holes in the battery cover and having an insulating collar embracing and surrounding each vent tube. Fig. 2 and Fig. 3 show schematically in plan view two and four vent tubes respectively having a common collar, and Fig. 4 shows in vertical section and more in detail the arrangement of two vent tubes, or the front of two rows each of a suitable number of vent tubes, having a common collar. Fig. 5 shows in vertical section a modification of the shape of the collar in such a manner, that it will serve also as a cover for the battery tank.

As shown in Fig. 1 the vent tubes 3 of the cells 1 extend through holes in the cover 5 of the battery tank 9, the cover being suitably made wholly or partly of insulating material, for instance of sheet iron with a coating 12 of hard rubber or other resistant insulating film such as some form of plastic. The diameter of said holes is larger than the outer diameter of the vent tubes.

The upper flange 2 of the vent tube 3 is embraced by the upper or inner rim 15 of a collar 4 of electrically insulating material, which is also resistant against liquids, such as alkaline solution and oil, used in batteries of this kind, suitable material for the purpose being for instance soft rubber (preferably synthetic rubber such as neoprene, buna etc.) or plastic, which is elastic and flexible enough to secure a water-tight fit of the upper rim of the collar 4 round the upper or inner part of the vent tube 3, even if the latter does not stand exactly in the middle of the hole in the cover 5. The tightening is to be further secured by a wire binding 6 or in other suitable manner, for instance as shown in Fig. 5 by pressing the upper or inner rim 15 of the rubber collar by means of a ring nut 10 against a shoulder 11 on the vent tube 3. The lower or outer rim 16 of the collar 4 is adapted to fit water-tightly against the battery cover 5, for instance against a flange 7 pressed up round the hole in said cover 5 or in other suitable manner, the tightening here also being further secured by a wire binding 8 or in other manner. In Fig. 1 and Fig. 5 the surface of the oil contained in the battery tank 9 is indicated by numeral 13.

Should electrolyte escape through the vents 3 of the cell 1, for instance by boosting charge, or water spilled when refilling the cells, the liquid will flow off the outside of the rubber collar 4 and the top surface of the battery cover 5, with no possibility of penetrating along the outside of the vent tubes 3 into the oil-filled battery tank 9 even if the holes from practical reasons are made rather large.

The above described arrangement can also, as schematically shown in Fig. 2 and Fig. 3 and more in detail in Fig. 4, be applied to two or more vent tubes 3 extending one from each of several cells 1, or from each compartment of so called twin cells, with a common collar 4, in which case the vent tubes 3 are preferably placed near an upper edge or in an upper corner on the respective cells, for instance as indicated in Fig. 2 and Fig. 3.

Another embodiment of this invention is shown in Fig. 5. The shape of the collar 4 is here modified in such a way, that its lower rim 16 can be fitted directly to the upper edge 7 of the battery tank 9, the collar 4 thus simultaneously serving as a cover 5 for the said tank. The material of the cover should in this case be the same as above mentioned for the collar. A water-tight fit between the lower rim 16 of the modified collar 4 or cover 5 in Fig. 5 and the upper edge 7 of the battery tank 9 can of course be established in many different previously known manners, as for instance, as shown in Fig. 5, by means of a wire binding 8 or as shown in Fig. 1, by means of packing 17 held between iron strengthening flanges by screws 18.

It should be apparent that in the meaning of the invention the collar of Figs. 1 to 4 and the cover of Fig. 5 are one and the same thing, both being composed of one or several upper tightening parts 15, of an intermediate member or part shown at 4 in Fig. 1 and Fig. 4 and at 4 and 5 in Fig. 5 and of a lower tightening part 16.

In connection with all the forms of the invention disclosed in this application attention is directed to the fact that the cover 5 in each instance has aperture means to accommodate the vent tubes 3 and through which the said tubes 3 project, the said aperture means having dimensions transverse to the axis of the tubes 3 in excess of the total transverse dimensions of the tubes 3, while each cover 5 has embodied therewith adjacent each vent tube 3 a resilient portion 4 which encompasses the tubes and provides for lateral yielding motion of this portion to accommodate inaccuracies of alignment of the vent tubes 3 with respect to the aperture means through which they project and also including portions defining a tightening collar surrounding each tube.

The details contained in the above described arrangements can of course be varied in many different ways as regards shape and embodiment without deviating substantially or in principle from the main characteristic feature of the invention, viz. the provision of an elastic and watertight insulating connecting member 4 between the vent tubes 3 of the cells 1 and the cover 5 of the battery tank 9 or directly with the tank.

I claim:

1. In an electric storage battery the combination of a battery tank, a plurality of cell cans disposed in the tank and submerged in an insulating material filling the tank, vent tubes on the cell cans, a cover for said tank, an opening in said cover for a plurality of vent tubes of adjacent cell cans and a flexible tightening collar common to said vent tubes and having a corresponding number of holes, inner rims forming the edges of said holes and tightening against the vent tubes, an outer rim tightening against the edge of said opening in the cover, and an intermediate portion arranged to be relieved of tightening pressure and adapted to yield laterally so as to accommodate for inaccuracies in the positioning of the vent tubes relatively to the opening in the cover and the holes in the collar.

2. In an electric storage battery the combination of a battery tank, a plurality of cell cans disposed in the tank and submerged in an insulating material filling the tank, vent tubes for the cell cans grouped together and located near adjacent corners of the appertaining cell cans, a cover for said tank having an opening for all the tubes grouped together, a flexible tightening collar common to said vent tubes and having a corresponding number of holes adapted to receive one of each of the vent tubes, inner tightening means for tightening the collar against each of the vent tubes, and outer tightening means for tightening the collar against the edge of the opening in the cover, the portion of the collar extending between the inner and outer tightening means being free of tightening pressure and adapted to yield laterally so as to accommodate for inaccuracies in the positioning of the vent tubes relatively to the opening in the cover and the holes in the collar.

3. In an electric storage battery the combination of a battery tank, a plurality of cell cans disposed in the tank and submerged in an insulating material filling the tank, insulating partitions inserted between the cells, a rigid cover enclosing the cells within the battery tank, terminals and means for electrically connecting the cells provided inside the tank and below the cover, vent tubes fixed to the cells and projecting each through a hole in the cover which is wider than the tube so as to allow a displacement of the vent tube relatively to the hole, a flexible tightening collar for each of said tubes having an inner rim tightening against the vent tube, an outer rim tightening against the edge of the opening in the cover, and an intermediate portion relieved of tightening pressure and yielding laterally so as to accommodate for inaccuracies in the positioning of the vent tube relatively to the opening.

4. In an electric storage battery the combination of a battery tank, a plurality of cell cans disposed in the tank and adapted to be submerged in an insulating material filling the tank to a depth in excess of the height of the said cans, insulating partitions inserted between the cans, a cover for said tank for enclosing said cans within the same, terminals and means for electrically connecting the cells of the cans encompassed within the tank and beneath the cover, vent tubes fixed to said cell cans and projecting outwardly thereof, said cover having aperture means to accommodate said vent tubes and through which said tubes project and said cover having embodied therewith adjacent each vent tube a resilient portion encompassing the tubes providing for lateral yielding motion of the portion to accommodate inaccuracies of alignment of the vent tubes with respect to the aperture means through which they project and including portions defining a tightening collar surrounding each tube, means for tightening the cover relative to the vent tubes, and means for tightening said cover against the upper portion of the tank.

CARL HILDING OSSIAN LÜBECK.

REFERENCES CITED

The following references are of record in the file of this patent:

UNITED STATES PATENTS

| Number | Name | Date |
| --- | --- | --- |
| 1,012,096 | Pearce | Dec. 19, 1911 |
| 1,086,710 | Hoopes | Feb. 10, 1914 |
| 1,474,510 | Campbell | Nov. 20, 1923 |
| 1,599,836 | Owen | Sept. 14, 1926 |
| 1,632,364 | Carpenter | June 14, 1927 |

FOREIGN PATENTS

| Number | Country | Date |
| --- | --- | --- |
| 211,714 | Great Britain | of 1924 |
| 394,124 | Great Britain | of 1933 |
| 531,774 | Great Britain | Jan. 10, 1941 |
| 866,356 | France | May 5, 1941 |